May 27, 1969 R. ATKIN 3,446,879
METHOD AND MEANS FOR PRESSURE-MOULDING OF ARTICLES BY
CONTROLLING THE FLUID PRESSURE THROUGH
UTILIZATION OF THE DEFORMATION
OF THE PLATEN
Filed Feb. 15, 1966 Sheet 1 of 2
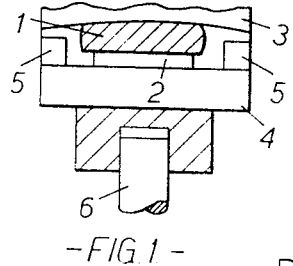
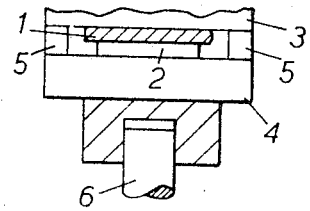
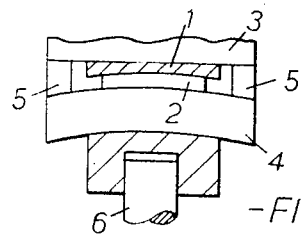
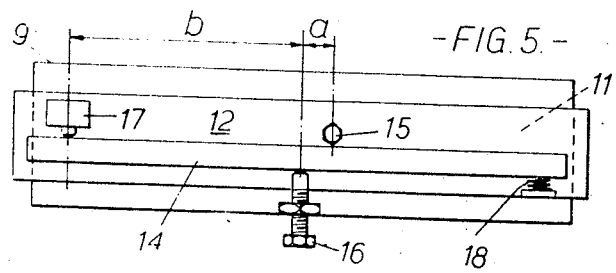
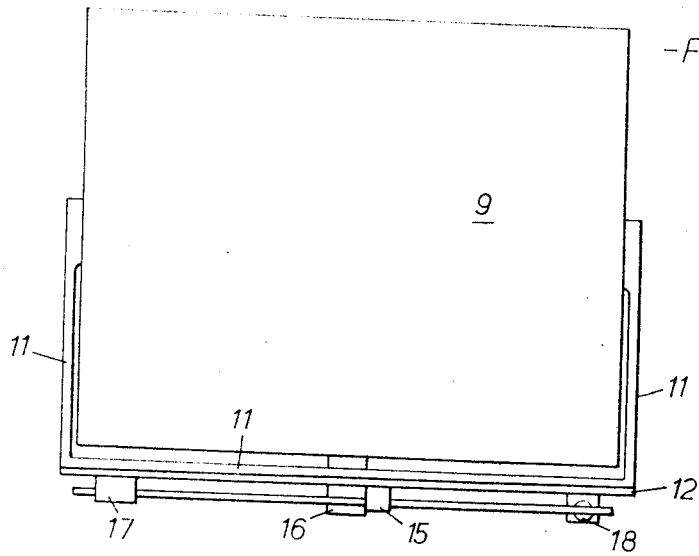
INVENTOR:
Ronald Atkin
BY
Pierce, Scheffler & Parker
attorneys

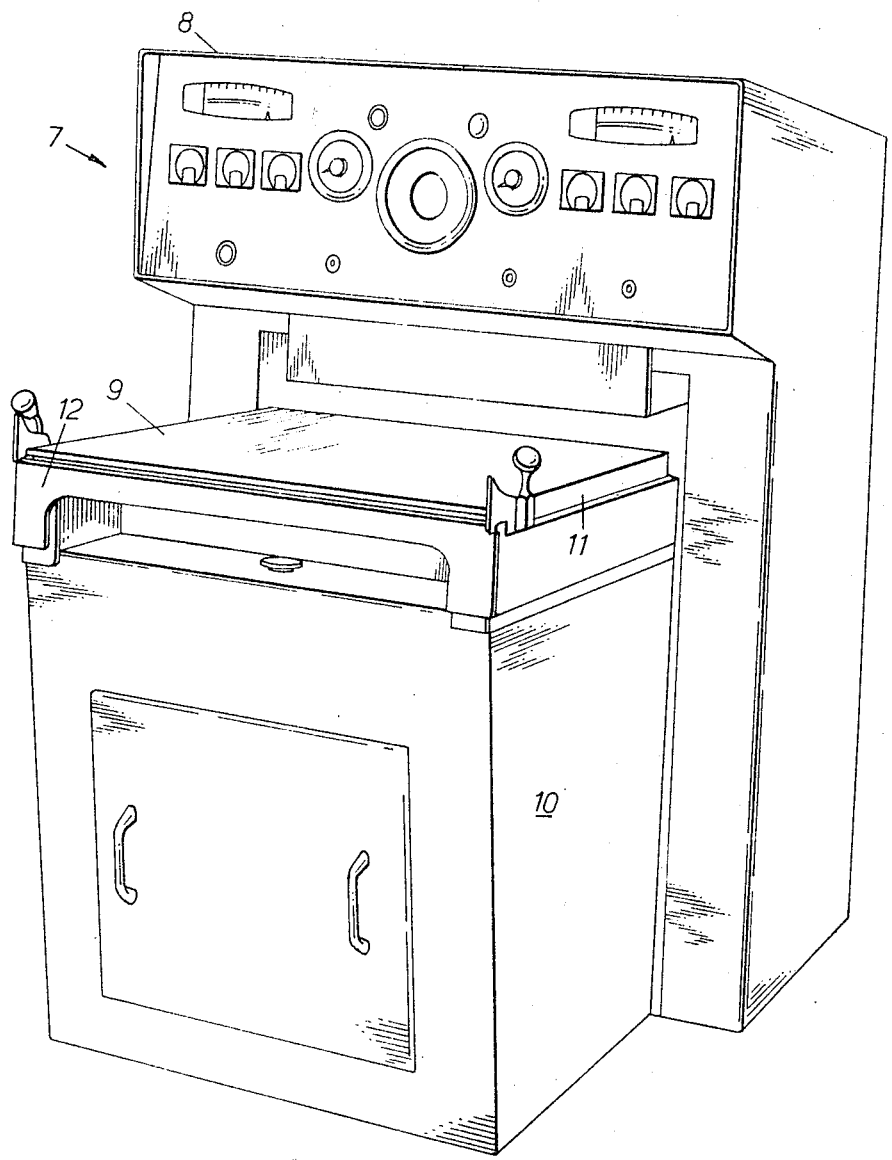

United States Patent Office 3,446,879
Patented May 27, 1969

3,446,879
METHOD AND MEANS FOR PRESSURE-MOULDING OF ARTICLES BY CONTROLLING THE FLUID PRESSURE THROUGH UTILIZATION OF THE DEFORMATION OF THE PLATEN
Ronald Atkin, Lofthouse, Wakefield, England, assignor, by mesne assignments, to United Shoe Machinery Corporation, Flemington, N.J., a corporation of New Jersey
Filed Feb. 15, 1966, Ser. No. 527,716
Claims priority, application Great Britain, Feb. 17, 1965, 6,796/65
Int. Cl. B29c 3/02
U.S. Cl. 264—40                         9 Claims This invention relates to the pressure-moulding of articles to exact dimensions in materials or compounds, such as in rubber or plastics or asbestos or like materials or compounds.

For example, it is known to mould sheet or granular material of rubber or plastics material to exact dimensional thickness between pressure applying parallel faces of upper and lower platens of hydraulically operated apparatus. This form of pressure-moulding employs bearers of a selected thickness between the platens and is particularly used in producting plastics material matrices and rubber plates for use in the printing industry. In these instances the effective thickness must not only be held within very close limits during the moulding operation but an exact thickness must be produced throughout the whole area of the article. Moreover, it is important that care must be taken during the application of the fluid pressure, otherwise deformation of the printing impression may occur.

The invention is applicable to other pressure-moulding operations.

According to the present invention there is provided a method of controlling a pressure-moulding operation consisting in compressing material between two faces by means of fluid pressure, positively restraining said faces from further relative movement and utilizing the pressure and said restrainment to cause a slight temporary deformation in part of the pressing means, and using said deformation to automatically control the moulding pressure.

The invention may include causing the automatic release of air and/or gas from the moulding region to prevent it being trapped in, or in relation to, the material being moulded.

The invention will now be more particularly described with reference to the accompanying drawings, in which:

FIG. 1 is a diagrammatic view indicating the pressure-moulding of an article with insufficient pressure;

FIG. 2 is a similar diagrammatic view indicating sufficient applied pressure;

FIG. 3 is a similar diagrammatic view indicating excess pressure with consequent deformation of the support member, the deformation being exaggerated for illustrative purposes;

FIG. 4 is a perspective view of a moulding press;

FIG. 5 is a front view of the improved control apparatus; and

FIG. 6 is a plan view of FIG. 5.

Referring to the drawings, when moulding printing plates 1 on their associated moulds 2 by conventional means, a hydraulic moulding press having two platens 3 and 4 with heated flat surfaces is employed. The two heated surfaces of the platens are brought together with the moulding material and original or mould between them and the required final thickness is governed by means of spacer bearers 5, one at each side of the machine faces, of a thickness equal to the desired printing plate thickness plus the mould or original thickness. When insufficient pressure is exerted (FIG. 1) by a centrally positioned ram-cylinder unit 6 the printing plate 1 is not reduced sufficiently in thickness and the spacer bearers are not in contact with the machine surfaces. Under these conditions the surface of platen 3, opposite to that through which the ram is exerting pressure, will deform by bending, causing a plate 1 of excess thickness toward the centre in addition to an overall thickness error due to the spacer bearers not being clamped. When the correct pressure is applied throughout the moulding cycle, such pressure requirement varying throughout the cycle as also between one work piece and another, the upper surface (as shown in FIG. 1) is deformed by bending due to the influence of the material being moulded. When final thickness of the article being moulded is achieved and the spacer bearers 5 are in contact with the two surfaces, pressure must be regulated to the minimum necessary to maintain this condition (shown in FIG. 2) during the time when the material solidifies or cures. Excessive pressure exerted at this time will result in a deformation or bending of the lower surface of platen 4 (shown in FIG. 3) causing inaccuracy in the moulded article due to thinning down in the centre. On the other hand, this deformation whilst very slight can be utilized to control the pressure which is the principle of this invention.

The invention may be applied to various pressure-moulding machines or apparatus. A particular form of hydraulic press machine 7 (FIG. 4) includes an upper press structure 8 including an upper platen assembly comprising a faced platen 3 with insulating means for preventing the transmission of heat to the upper machine structure. For example, heat-resistant board is mounted next to the platen. A similar arrangement is provided for the lower platen 4, which again can be an assembly using heat insulating means of the above type. The two opposed faces of the platens 3, 4 require to be in exact parallelism. The lower platen 4, the support member, is mounted on, or forms part of a hydraulic cylinder and ram unit 6 which may include a main ram with a pilot ram contained therein. The upper and lower platens may be heated electrically or in some other manner and the lower platen, or platen assembly, is guided so that its face will remain parallel with the face of the upper platen and such guide means may be adjustable. A rolling worktable 9 or other device is carried by guides on the hydraulic machine lower structure 10 to normally lie in advance of the lower platen 4 to facilitate the preparation of workpieces for insertion into the pressure-moulding apparatus. When loaded the worktable is pushed over the platen 4 to in effect become part of the work support member. The hydraulic pressure generating unit is in the machine structure 10.

The above machine is provided with a pressure control device including a U-shaped (in plan) horizontal member 11 attached at each side to the centre region of the platen 4. A mounting plate 12 is attached to the U-shaped member 11 and carries a pivoted bar 14 which is located by a top pivot 15 lying to one side of the worktable centre in a fixed position. A centrally positioned pivot 16 is attached to the support member (worktable) 9 and is adjustable in a vertical plane. A micro-switch 17 attached to the mounting plate 12 is positioned in contact with the pivoted bar 14 at a definite distance from the central pivot 16 at the opposite side to the top pivot 15. The other end of the pivoted bar 14, opposite to the micro-switch 17, is in contact with a coil spring 18 which is preferably adjustable. Deformation of the support member 4 (as shown in FIG. 3) results in a relative movement of the central pivot 16 with regard to the anchor points of the U-shaped member 11 on the lateral centre line of the support member. Such relative movement causes the pivoted bar 14 to pivot on members 16 and 15 resulting in a vertical movement of the end of the pivoted bar 14 and such movement causes the electrical micro-switch 17 to be actuated. Spring 18 being positioned in contact with the pivoted bar at the opposite end to the micro-switch provides spring tension in the pivoted bar 14 which eliminates the possibility of mal-adjustment due to shock and vibration. Pivoted points 15 and 16 are spaced apart to a set dimension $a$ and the micro-switch 17 is positioned a set distance $b$ from the pivot 16. Thus the relation of $b$ distance to $a$ distance provides magnification of movement between any support member deformation and micro-switch actuation. This magnification is according to $$\frac{\text{distance } b}{\text{distance } a} \times \text{support member deformation}$$

With such magnification, extremely small deformation movements of the support member 4 can be detected.

When conditions in the material 1 being moulded are such that excess pressure is being exerted by the machine, the support member 4 and 9 will tend to adopt formation (as shown in FIG. 3). Relative movements of the sides to the centre of the support member causes the micro-switch 17 to be actuated. Such action is caused to control valve means in the hydraulic pressure system so that the pressure is reduced to the point where the support member straightens causing the micro-switch to be de-actuated at which point fluid pressure reduction ceases. Any further deformation of the support member will again cause the micro-switch to be actuated with a resultant further easing off of the applied pressure.

In operation a pressure-moulding action will begin and continue until relative movement occurs between the centre region and side extremities of the lower platen in its position relative the upper platen. This relative movement will cause the pressure control device to operate. This will result in the stopping of the hydraulic pump motor and the opening of a solenoid operated valve in the hydraulic system which will allow oil to escape from both pilot and main ram chambers at a rate determined by a fine control valve. This pressure reduction will continue until alignment of said centre region and side extremities of the worktable and parallelism of the platen faces is re-established. At this point the pressure control device re-trips the micro-switch to de-energise the aforesaid control valve for preventing further "bleeding" of the circuit fluid pressure. This state of face contact pressure will be maintained for a pre-set period of cure or setting of the material being pressure-moulded and such pre-set timer will then cause solenoid operated valves to be energised and the pump to be re-started.

The above arrangement describes the action of the pressure control device for a particular kind of pressure-moulding machine in which the pressure is maintained with the hydraulic pump stopped but this may be applied to other hydraulic or pneumatic systems such as those utilising a variable pressure with a continuously running pump. Such a system can employ a variable pressure relief valve the setting of which is adjusted during the cycle of operations as desired, either manually or automatically. A further alternative system can be one where a continuously running pump is employed together with a means of bleeding all or part of the supply to give a variable pressure or speed as necessary.

What I claim is:

1. Method of controlling a pressure-molding operation consisting in compressing material between two faces by means of fluid pressure, positively restraining said faces from further relative movement, utilising the pressure and said restrainment to cause a slight temporary deformation in part of the pressing means, and using said deformation to automatically control the moulding pressure.

2. Method of controlling a pressure-moulding operation according to claim 1, in a fluid pressure operated press, consisting in inserting material and moulding means between two platen faces in the press, controlling the fluid pressure to compress the material between said faces, positively restraining the faces at a predetermined distance apart, utilising the applied pressure and said restrainment to cause a slight temporary deformation of one platen of the press, and using said deformation to automatically control the moulding pressure to automatically ease off the pressure slightly but to maintain the required moulding pressure for a given moulding period.

3. Method according to claim 2, including bringing two faces in hydraulic press apparatus into correct pressing relationship through rigid interposed spacer means, allowing said pressure to cause temporary slight deformation of one face part of the apparatus, causing said deformation to operate an electrical switch through pivoted means and operation of such switch to control the fluid pressure by means of a valve.

4. Method according to claim 1, including moving a pressure applying face part in relation to another face part by means of fluid pressure, arresting said relative movement by interposed rigid means, causing the fluid pressure to deform temporarily one of said face parts slightly on each side of its centre through the medium of said rigid means, and causing such deformation to operate control means to ease the fluid pressure a required degree.

5. Method according to claim 4, including using the temporary deformation to operate pivoted means to operate an electric switch to operate valve means in the fluid pressure operating system which supplies the moulding pressure.

6. Method according to claim 4, including causing the temporary deformation to apply mechanical pressure at one off-set point to lever means to pivot it about a stationary fulcrum located on the centre line of the deformed face part and thus magnify the leverage to operate the switch.

7. Pressure-moulding apparatus for carrying out the method according to claim 1, comprising a pair of platens between which articles can be moulded, a fluid pressure system for moving one platen towards the other, spacing means for arresting said relative movement in a positive manner, means for controlling the system for it to exert sufficient pressure on one platen through the spacing means to cause slight deformation of said platen, operating means attached to said platen to be moved by slight deformation of the pressurised platen, and a pivoted lever bar positioned to be moved by said first operating means in a manner to magnify the actuating movement sufficiently to cause the operation of valve means in the pressure system to ease the applied fluid pressure.

8. Apparatus according to claim 7, wherein the deformable platen has said operating means secured rigidly to at least one side to move with said slight deformation of the platen on said side region, said lever bar pivoted intermediate its ends on a stationary fulcrum on the centre line of the platen, said operating means engaging the lever bar at a point oppositely directed to and off-set from the lever bar fulcrum, and an electric switch operable by the lever bar at a point remote from the force applying point beyond the lever bar fulcrum.

9. Apparatus according to claim 8, wherein the lever bar located on said fulcrum carried by the platen on the platen centre line has spring loading at the end opposite to the switch operating end to provide spring tension in the lever.

References Cited

UNITED STATES PATENTS

| | | |
|---|---|---|
| 1,963,125 | 6/1934 | Fuchs. |
| 2,317,839 | 4/1943 | Westin. |
| 2,332,674 | 10/1943 | Smith. |
| 2,373,201 | 4/1945 | Smith. |
| 2,841,082 | 7/1958 | Kirkpatrick. |
| 2,956,307 | 10/1960 | Fahrni. |
| 3,082,478 | 3/1963 | Hawkins. |

J. HOWARD FLINT, JR., *Primary Examiner.*

U.S. Cl. X.R.

18—16